US012012314B2

(12) United States Patent
Rauh et al.

(10) Patent No.: US 12,012,314 B2
(45) Date of Patent: Jun. 18, 2024

(54) WORKING MACHINE COMPRISING A BOOM AND A BOOM BRACING

(71) Applicant: Liebherr-Hydraulikbagger GmbH, Kirchdorf/Iller (DE)

(72) Inventors: Sebastian Rauh, Nersingen/Oberfahlheim (DE); Tobias Riedmiller, Legau (DE); Sebastian Stanger, Dietenheim (DE); Bernd Wager, Kirchdorf an der Iller (DE); Constantin Wegmann, Kempten (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 647 days.

(21) Appl. No.: 17/089,198

(22) Filed: Nov. 4, 2020

(65) Prior Publication Data

US 2021/0147197 A1 May 20, 2021

(30) Foreign Application Priority Data

Nov. 14, 2019 (DE) ..................... 10 2019 130 784.8

(51) Int. Cl.

| | |
|---|---|
| ***B66C 23/82*** | (2006.01) |
| ***B66C 23/64*** | (2006.01) |
| *B66C 23/00* | (2006.01) |
| *E02F 3/30* | (2006.01) |
| *E02F 3/38* | (2006.01) |
| *E02F 3/96* | (2006.01) |

(52) U.S. Cl.

CPC ............ *B66C 23/823* (2013.01); *B66C 23/64* (2013.01); *B66C 23/54* (2013.01); *E02F 3/301* (2013.01); *E02F 3/382* (2013.01); *E02F 3/963* (2013.01)

(58) Field of Classification Search

CPC ........ E02F 3/301; E02F 3/382; B66C 23/823; B66C 23/64; B66C 23/54

See application file for complete search history.

(56) References Cited

U.S. PATENT DOCUMENTS 3,388,819 A * 6/1968 Przybylski ............. E02F 3/382 414/694
3,392,855 A * 7/1968 Przybylski ............. E02F 3/382 414/694
4,046,270 A * 9/1977 Baron ....................... E02F 3/30 60/413
4,221,531 A * 9/1980 Baron ..................... E02F 3/302 414/722
4,363,413 A * 12/1982 Gyomrey ............. B66C 23/703 212/262
4,544,071 A 10/1985 Poock
4,982,853 A * 1/1991 Kishi .................... B66F 11/046 212/230

(Continued)

FOREIGN PATENT DOCUMENTS

DE 3030822 A1 3/1981
DE 3838975 A1 5/1990

(Continued)

*Primary Examiner* — Gerald McClain

(74) *Attorney, Agent, or Firm* — Dilworth & Barrese, LLP

(57) ABSTRACT

A working machine, in particular a material handling machine, has a boom and a boom bracing actuated by an actuator operatively connected to the boom bracing by a lever rotatably articulated to a turntable, to introduce the required tensile force into the bracing.

14 Claims, 7 Drawing Sheets

(56) References Cited

U.S. PATENT DOCUMENTS

| | | | | |
|---|---|---|---|---|
| 10,428,490 | B2 * | 10/2019 | Wagner | E02F 3/38 |
| 2018/0072540 | A1 * | 3/2018 | Stangl | B66C 23/825 |
| 2018/0179727 | A1 * | 6/2018 | Wagner | E02F 3/38 |

FOREIGN PATENT DOCUMENTS

| | | | | | |
|---|---|---|---|---|---|
| DE | 29621010 | U1 | * | 4/1997 | E02F 9/0808 |
| DE | 29621010 | U1 | | 4/1997 | |
| DE | 202005009317 | U1 | | 10/2006 | |
| DE | 202005009317 | U1 | * | 11/2006 | B66C 23/74 |
| DE | 202015006782 | U1 | | 12/2016 | |
| DE | 202015006782 | U1 | * | 2/2017 | B66C 23/62 |
| JP | 2008019680 | A | * | 1/2008 | |
| SU | 222975 | A1 | * | 10/1968 | |
| SU | 239519 | A1 | | 3/1969 | |
| SU | 1537642 | A1 | | 1/1990 | |
| SU | 1747377 | A1 | | 7/1992 | |
| SU | 1796584 | A1 | | 2/1993 | |
| WO | 2018/138409 | A1 | | 8/2018 | |

* cited by examiner

WORKING MACHINE COMPRISING A BOOM AND A BOOM BRACING

BACKGROUND OF THE INVENTION

The invention relates to a working machine, in particular a material handling implement, comprising a boom and a boom bracing to be actuated by means of an actuator.

A material handling machine, such as an excavator, comprising a boom system at whose end the attachment needed is mounted. The boom regularly is luffably articulated to the turntable of the machine. During operation, the load picked up by means of the implement generates a bending moment on the boom system, which in particular in large implements or with a high payload requires suitable technical measures to be taken to ensure the boom stability.

To increase the lifting capacity of the material handling machine, the boom system therefore must be dimensioned stronger, which however has a disadvantageous effect on the manufacturing costs for the machine as well as its weight and hence energy efficiency.

To avoid the aforementioned disadvantages, an alternative route has therefore been taken in WO 2018/138409 A1. There is proposed an excavator comprising a braced boom system. However, the solution shown has the disadvantage that a reduction of the occurring bending moment cannot be achieved uniformly over the entire boom length. In particular excavators, however, regularly are constructed with special boom shapes that do not adopt a straight course, but instead adopt shapes bent like a banana, or angled or kinked shapes. Moreover, side moments neither are taken into account nor reduced in the solution of WO 2018/138409 A1.

SUMMARY OF THE INVENTION

Therefore, it is the objective of the present application to equip a prior art implement, in particular a material handling machine such as an excavator, with an improved boom bracing in order to eliminate the above-mentioned shortcomings and in the ideal case further optimize the maximum payload of the implement.

This object is achieved by a working machine according to the features herein. Advantageous embodiments of the working machine are subject-matter of the description herein.

According to the invention, it is proposed that the actuator for actuating the boom bracing is articulated to the turntable. However, the actuator is not directly connected to the boom bracing, but instead indirectly via a connecting link in the form of an actuator lever. Such an actuator lever on the one hand is connected to the mechanically moved actuator element and on the other hand is connected to the bracing, in particular to at least one tension element of the bracing. The actuator lever furthermore is rotatably articulated to the material handling machine, in particular to the turntable, expediently about a horizontal axis. With the kinematics described here, the actuator is able to introduce the necessary tensile force into the bracing.

With the proposed kinematics, a reduction of the bending moment can be achieved in a simple way over a larger range of the boom length. In particular in special boom shapes, the distance between bracing and neutral fiber of the boom here can be adapted to the boom contour as needed. In addition, the proposed kinematics permits a certain universality as regards the installed boom types or boom sizes, i.e. the combination of actuator and actuator lever as well as their concrete arrangement on the turntable can be employed universally for different boom types and sizes, ideally with constant bearing points on the turntable.

Furthermore, this embodiment involves certain advantages when utilizing an energy recovery system, for example by means of an energy recovery cylinder arranged on the boom or uppercarriage, as an optimization of the torque characteristic of the energy recovery cylinder about the boom bolting point can be achieved. In this connection, energy recovery is effected when lowering the work equipment. The potential energy of the boom assembly here is stored in a pressure medium, e.g. by compression of a gaseous medium.

The actuator lever can be rotatably articulated to the uppercarriage at its end, while actuator and bracing then engage the free end of the actuator lever. Accordingly, the actuator is therefore of pulling design. When the actuator is designed as a cylinder, the tension in the bracing can be increased by retracting the cylinder rod. Alternatively, the actuator lever can be connected to the actuator with its first end and to the bracing with the second end. The articulation point of the actuator lever then is located between the aforementioned connecting points, and the articulation point preferably is located closer to the end-side connecting point of the actuator. In this case, the actuator is of pushing design, so that when using a cylinder actuator, an extension movement of the piston rod leads to an increase of the tension in the bracing.

According to an advantageous embodiment of the invention, the boom bracing can be of multipart design. What is conceivable is the composition of a plurality of bracing elements or tension elements, which are connected to each other via corresponding connecting points. Here, it is conceivable and particularly advantageous when individual tension elements are connected to each other via corresponding connection levers. Such connection levers on the one hand are articulated to the boom, while the tension elements are mounted at the free end of the connection levers. This provides for an additional support of the bracing with respect to the boom. The connection levers can be articulated to the boom either rotatably or also rigidly.

As already explained above, the boom bracing according to the invention is suitable for use with different types of boom. For example, an angled or kinked boom should be mentioned here, in particular a monobloc boom. Such booms can be of bent design like a banana or also of an angled or kinked design. Due to the multipart design of the boom bracing it is possible that the same likewise is designed with an appropriate angular offset, i.e. the bracing elements are connected to each other at a certain angle so that the bracing can be guided along the boom axis with an ideal distance in order to optimize the distance between the centroid of the boom system and the bracing. In particular, the distance between the bracing and the neutral fiber of the monobloc boom is adapted here as needed so that an ideal reduction of the bending moment can be achieved.

The uppermost tension element of the boom bracing can be articulated at the upper end of the boom. What may be advantageous is the articulation of the uppermost tension element to the connection assembly of the boom with a dipper arm of the working machine articulated thereto. The articulation of the uppermost tension element directly to the dipper arm likewise is imaginable.

As has already been explained above, a corresponding energy recovery cylinder can be provided. The same can serve as an additional lifting actuator for the boom system. The lifting actuator preferably can be designed either as a hydraulic cylinder which is connected to a hydraulic accumulator. The storage of energy takes place in the compressible medium in the accumulator. Alternatively, the lifting actuator can be designed as a cylinder in which a compressible medium is contained for energy storage.

Such a lifting actuator, preferably a hydraulic cylinder, is articulated both to the turntable and to the boom and pushes the boom upwards during lifting. During lowering of the boom system, the lifting actuator can utilize the resulting build-up of pressure for energy recovery. The use and mounting of the actuator lever on the turntable provides for a better adaptation of the torque characteristic of the energy recovery system about the boom bolting point on the uppercarriage. The greatest torque of the characteristic curve of the energy recovery system is obtained at a kinematically optimal boom slewing angle.

The at least one connecting lever for connecting the multipart boom bracing can be articulated directly to the boom. What is likewise imaginable is an articulation of the connecting lever to a bearing axle of the aforementioned lifting actuator. When a dipper arm with a separate dipper arm actuator for actuating the dipper arm optionally is provided on the boom, it is recommendable to mount at least one connecting lever (for connecting the upper tension elements) on the bearing point of the dipper arm cylinder.

What is also imaginable is an articulation of the at least one connecting lever to an optional boom transverse tube, i.e. to a tube which extends through the boom body transversely to the luffing axis and usually exits on the side walls of the boom system. Boom transverse tubes often are utilized for the improved introduction of actuator forces, e.g. of a lifting or dipper arm actuator, into the boom structure. The laterally exiting portion of the transverse tube then can form corresponding bearing points for the articulation of the at least one connecting lever. What is expedient is the formation of suitable tabs on the transverse tube, in particular in the exit area. The tabs are perpendicular to the tube circumference and permit the easy connection of the connecting lever.

According to a particularly preferred embodiment of the invention at least two boom bracings extending in parallel are provided. In parallel in this connection means extending side by side and is not to be understood in a strictly geometrical sense. Each of the at least two boom bracings extending in parallel can be designed according to the above explanations, i.e. can at least be equipped with at least one actuator lever and at least one associated actuator. The boom bracings extending in parallel can be composed of tension elements in a multipart form, which themselves are supported with respect to the boom. The connection of the connecting levers to the boom expediently is chosen the same for both boom bracings. It is also of great advantage when the bracings extend with a slight lateral offset with respect to the luffing axis of the boom, whereby a spatial or lateral bracing can be achieved in order to compensate possible side moments.

It is particularly advantageous when the boom bracings or their tension elements are guided above the side cheeks of the boom cross-section. This leads to the fact that the distance of the tension element centroid to the boom centroid, which is calculated parallel to the luffing plane, is greater than the distance of the boom upper chord to the boom body centroid. The distance of the tension element centroid to the boom body centroid, which is calculated transversely to the luffing plane, likewise is greater than the distance of the side plates of the boom to the boom body centroid.

BRIEF DESCRIPTION OF THE DRAWINGS

Further advantages and properties of the invention will be explained in detail below with reference to the exemplary embodiments illustrated in the drawings, in which.

DESCRIPTION OF THE PREFERRED EMBODIMENTS

Figure 1:
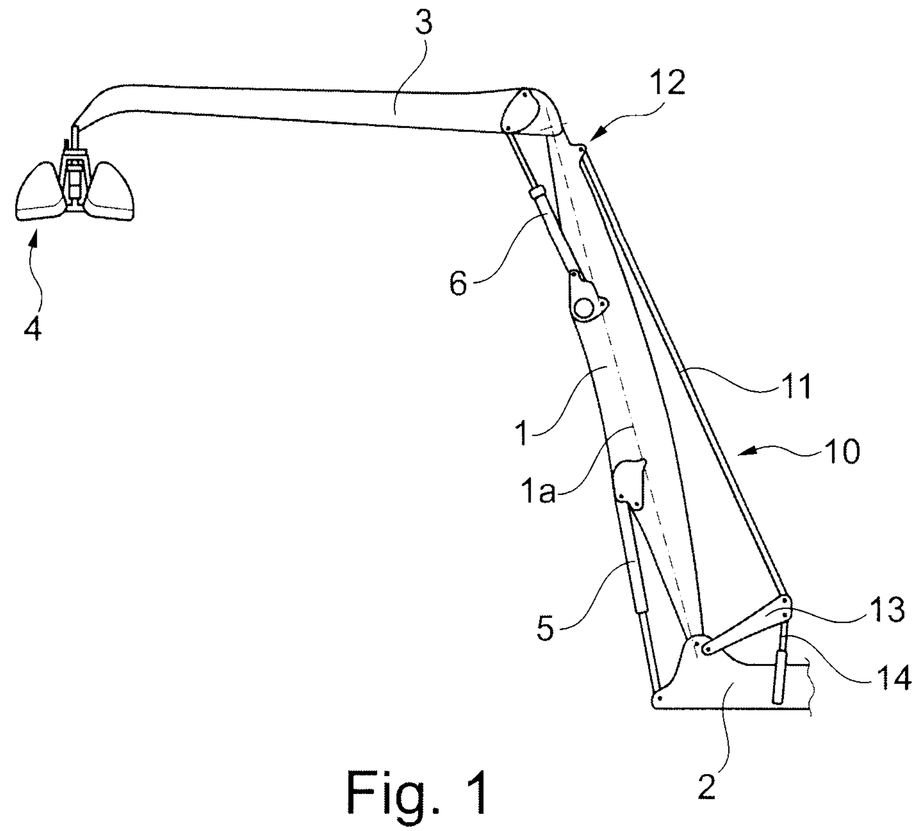
FIG. 1: shows a side view of the boom on a working machine of the invention according to a first exemplary embodiment.

The idea underlying the present invention can be clearly explained with reference to the first exemplary embodiment of FIG. 1, which shows a part of the working machine of the invention in the form of a material handling machine. There can be seen the box-shaped monobloc boom 1 which at its end is luffably articulated to a turntable 2 of the uppercarriage of the working machine. The neutral fiber of the boom always is designated with the reference numeral 1*a* both in FIG. 1 and in the further Figures. At the upper end of the boom 1 a dipper arm 3 also is pivotally articulated with respect to the boom 1, and the pivotal movement is effected by an actuator, e.g. a dipper arm cylinder 6. At its end, the dipper arm 3 carries an implement in the form of a gripper 4. According to the invention, the boom 1 now is braced by a bracing 10 in order to reduce the bending moment introduced into the boom 1 due to the load and thus to further increase the load-bearing capacity of the material handling implement.

The bracing 10 according to the first exemplary embodiment of FIG. 1 consists of an individual tension element 11 or a bracing rod, which is pivotally mounted in the articulation point 12 at the upper end of the boom head. Alternatively, the tension element can be configured as a cable or chain. The turntable-side end of the tension element 11 is pivotally attached to the free end of an actuator lever 13. One or more actuators in the form of a hydraulic cylinder or energy recovery cylinder 14 engage the same end of the at least one actuator lever 13. Concretely, the actuator 14 is fixed to the turntable, and the eye of the piston rod is pivotally mounted to the actuator lever.

Furthermore, the actuator lever 13 is rotatably mounted on the turntable 2 about a horizontal axis. In the exemplary embodiment shown here, the cylinder 14 is configured to be pulling, so that a retracting movement of the piston rod leads to an increase of the tension in the bracing 10. The resulting upward luffing movement of the boom 1 is supported by at least one hydraulic cylinder 5 which is connected to the boom 1 and to the turntable 2. An extending movement of the lifting actuator 5 supports the upward luffing movement, but at the same time the cylinder 5 can be used for energy recovery, in that during lowering of the boom 1 the rod of the cylinder is retracted by the dead weight of the boom and the corresponding compressible medium (gas) is compressed for energy storage.

Figure 2:
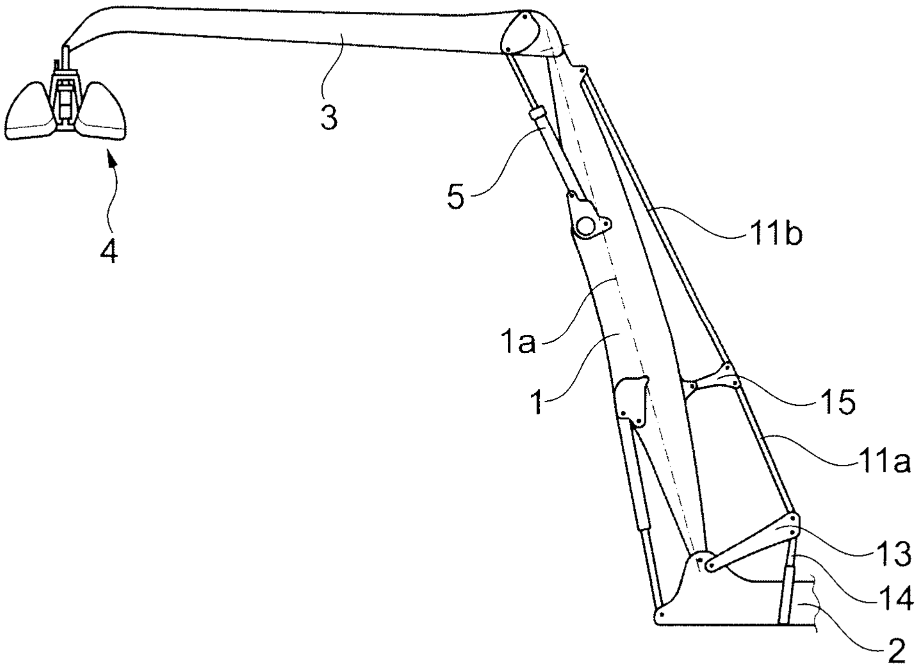
FIG. 2: shows a working machine of the invention according to the second exemplary embodiment.

An exemplary embodiment differing from FIG. 1 is shown in FIG. 2. The only change with respect to FIG. 1 consists in that the bracing here is of multipart design and is composed of several individual tension elements 11*a*, 11 *b*. The lower tension element 11*a* is connected to the upper tension element 11*b* via a connecting lever 15, wherein the lever 15 is pivotally mounted to the boom 1 and both tension elements 11*a*, 11 *b* pivotally engage its free end.

Figure 3:
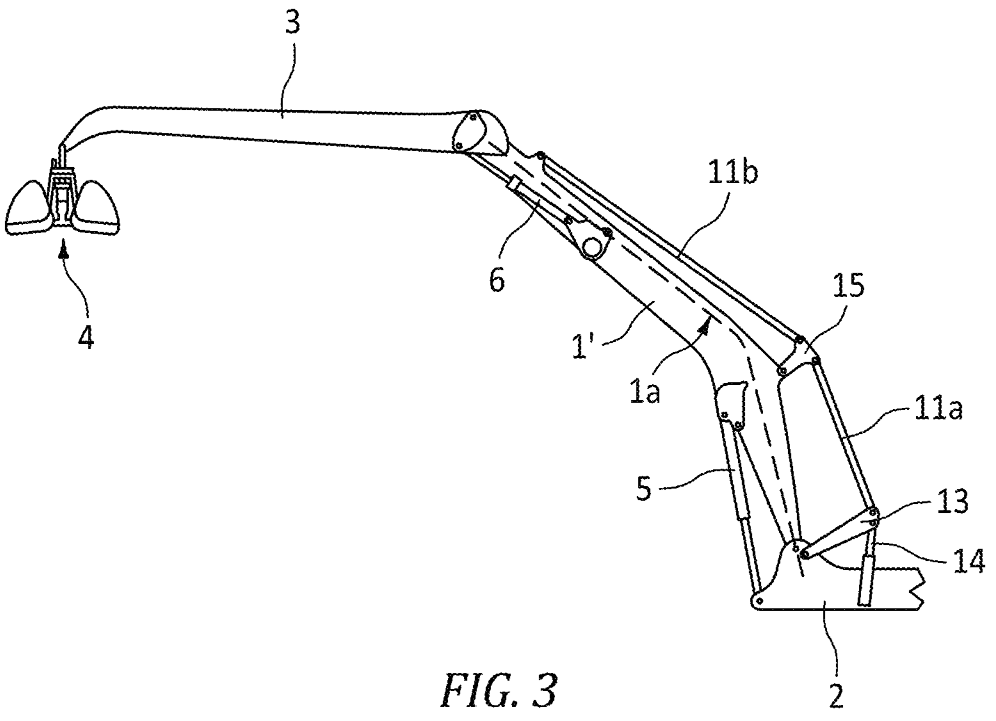
FIG. 3: shows a third embodiment of the working machine according to the invention.

FIG. 3 illustrates that the exemplary embodiment of FIG. 2 also can easily be used for other types of boom with a different boom shape. The boom 1' shown there likewise is designed box-shaped as a monobloc, but with an angled or kinked longitudinal extension. Due to the two-part design, the bracing can perfectly follow the neutral fiber of the monobloc 1'. The individual elements 11*a*, 11 *b* are connected via the connecting lever 15 with a certain angular offset.

Figure 4:
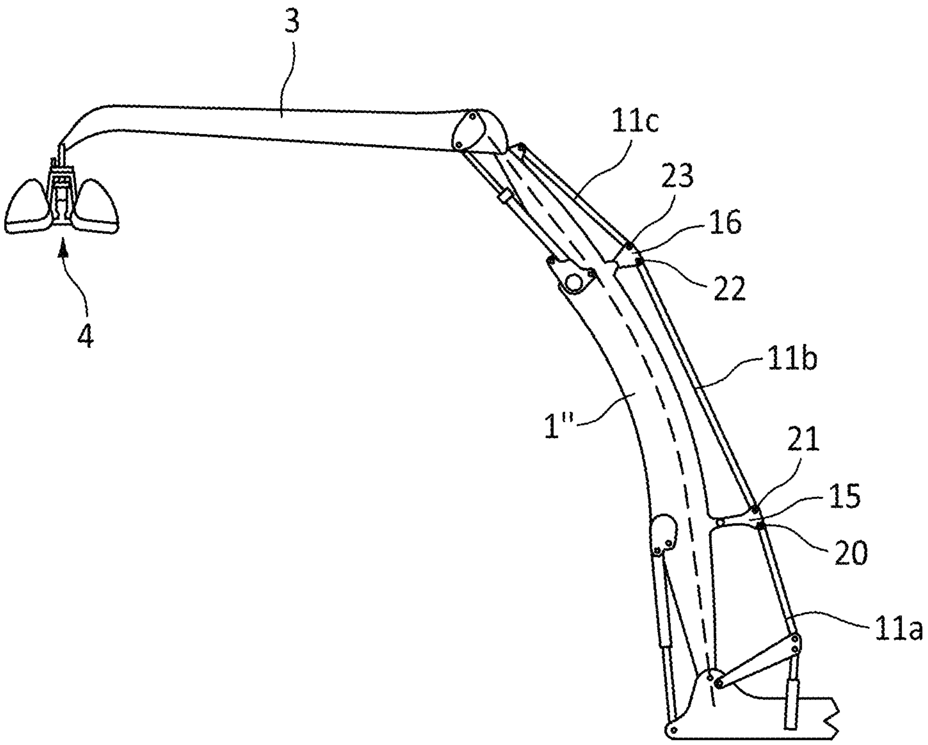
FIG. 4: shows a fourth embodiment of the working machine according to the invention.
Figure 5:
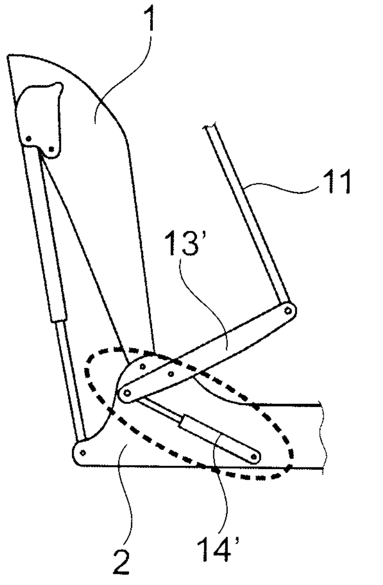
FIG. 5: shows a modification of the working machine of the invention according to one of the exemplary embodiments of FIGS. 1-4, FIG. 6: shows another modification of the exemplary embodiments as shown in FIGS. 1-4, FIG. 7: shows another modification of the exemplary embodiments as shown in FIGS. 1-4, FIG. 8: shows another modification of the embodiments as shown in FIGS. 1-4, FIGS. 9*a*, 9*b*: show another modification of the embodiments as shown in FIGS. 1-4, FIG. 10: shows another modification of the embodiments as shown in FIGS. 1-4, FIG. 11: shows another modification of the embodiments as shown in FIGS. 1-4, FIG. 12: shows a sectional representation through the boom system including the bracing according to a design variant with at least two bracings extending in parallel.

FIG. 4 shows another modification of the boom shape. The boom here is shaped as a banana-shaped mono boom 1. In this case, the bracing is of three-part design with the bracing elements 11*a*, 11*b*, 11*c*. Due to the three-part design of the bracing, another connecting lever 16 is to be provided.

The following FIGS. 5 to 13 show modifications of the presented exemplary embodiments of FIGS. 1-4. As has already been explained above, the kinematics of the actuator lever 13 and of the actuator 14 is of a pulling type in the embodiments of FIGS. 1-4. Alternatively, the kinematics might also be realized as pushing, as shown FIG. 5. In this case, one end of the actuator lever 13' is connected to the actuator 14', while the opposite lever end is connected to the bottommost tension element 11. The lever 13' is supported via an articulation point located between the aforementioned connecting points, which here is located closer to the connecting point of the actuator 14'. Lifting of the work equipment, i.e. luffing up the boom 1, then is achieved by extending the rod of the actuator 14'.

Figure 6:
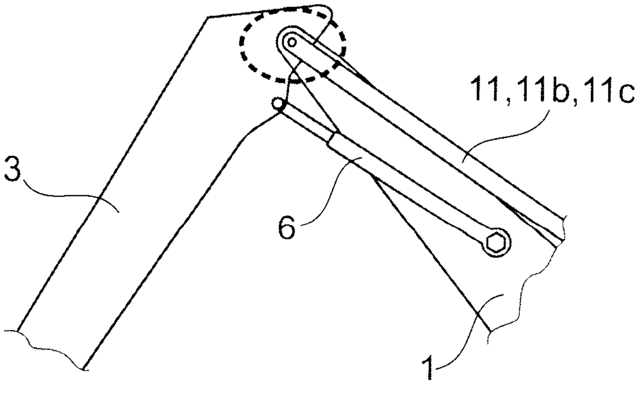

FIG. 6 shows a detail view of the articulation of the dipper arm 3 at the boom 1. In this modification, the uppermost tension element 11, 11*b*, 11*c* is connected to the bearing axle of the dipper arm 3 at the boom head.

Figure 7:
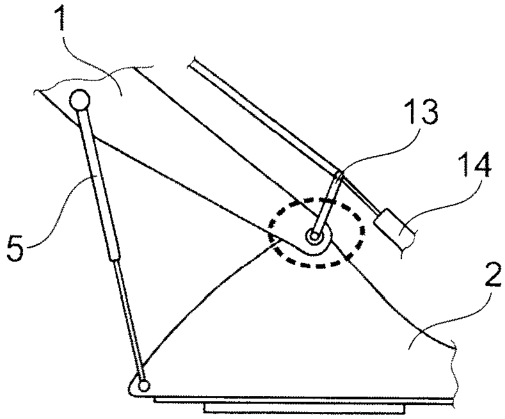

The embodiment of FIG. 7 relates to a modified articulation of the actuator lever 13 to the turntable 2. The articulation point here is chosen such that the same exactly coincides with the bearing point of the boom 1 on the turntable 2.

Figure 8:
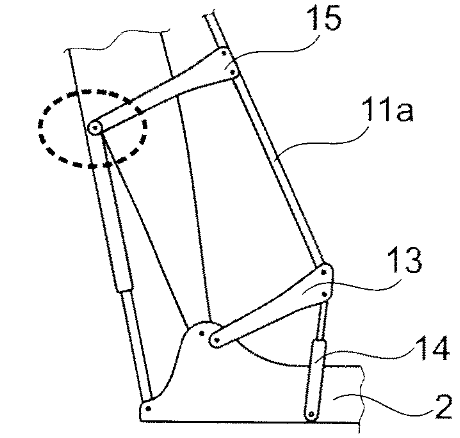

According to the modification of FIG. 8 it is proposed to articulate the at least one connecting lever 15 to the boom 1 in the region of the bearing point of the lifting cylinder 5, i.e. to articulate the same to the bolting present there.

Figure 9A:
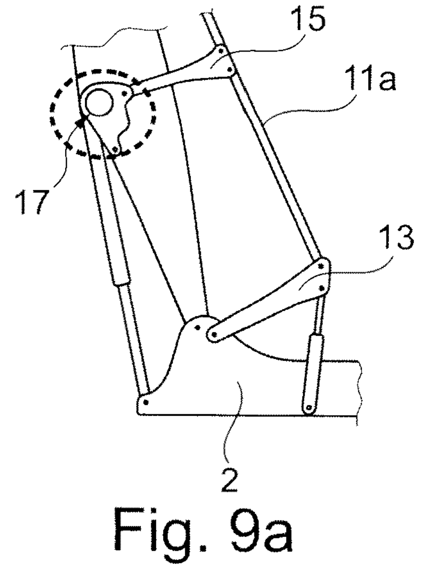
Figure 9B:
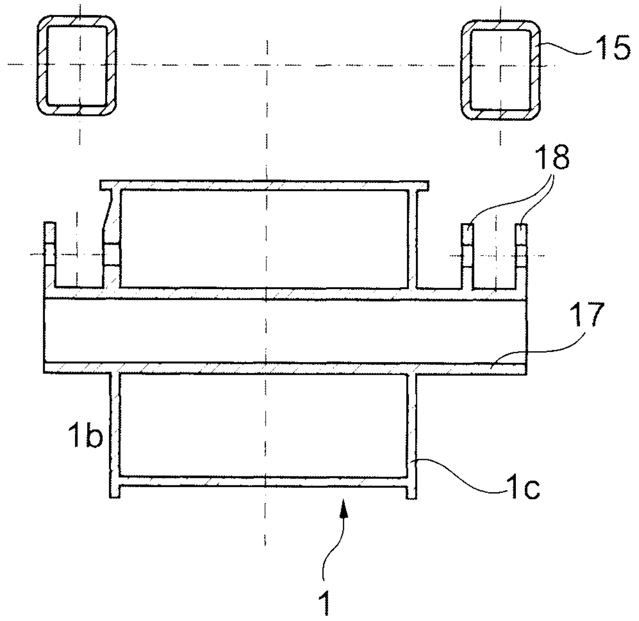

According to FIG. 9*a*, a configuration deviating therefrom is proposed. There is used an existing boom transverse tube 17 which usually serves for introducing the forces of the lifting actuator 5 into the boom system 1. The boom tube 17 extends transversely to the longitudinal boom axis in a horizontal direction and exits on the side walls 1*b*, 1*c* (see FIG. 9*b*) of the box-shaped boom 1. On the circumference of the exiting tube portion mounting tabs 18 are formed, which serve for bolting to the connecting lever 15. Position 11 shows some tension elements in section.

Figure 10:
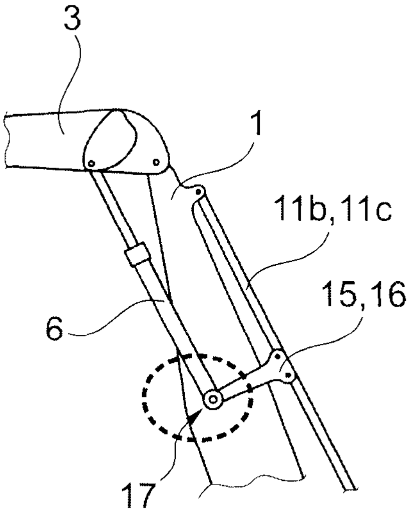
Figure 11:
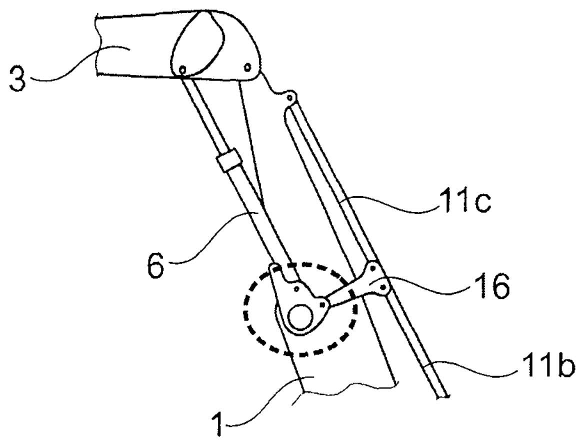

FIGS. 10 and 11 show corresponding modifications for the connection of the uppermost connecting lever 15, 16, which here is to be articulated in the region of the bearing axle of the dipper arm cylinder 6. When there is also provided a corresponding boom transverse tube 17, the same should be utilized for the connection of the connecting lever 15, 16 (FIG. 11), equivalently to the embodiment of FIG. 9*b*.

Figure 13:
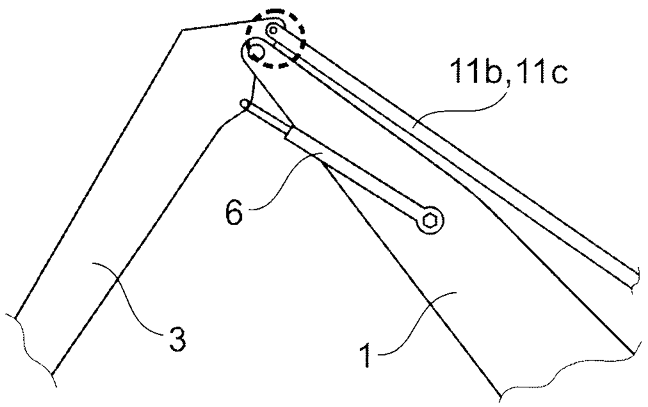
FIG. 13: shows another modification of the embodiment as shown in FIGS. 1-4.

FIG. 13 shows another modification with respect to FIG. 6, in which the uppermost tension element 11*b*, 11*c* is connected directly to the dipper arm 3.

Figure 12:
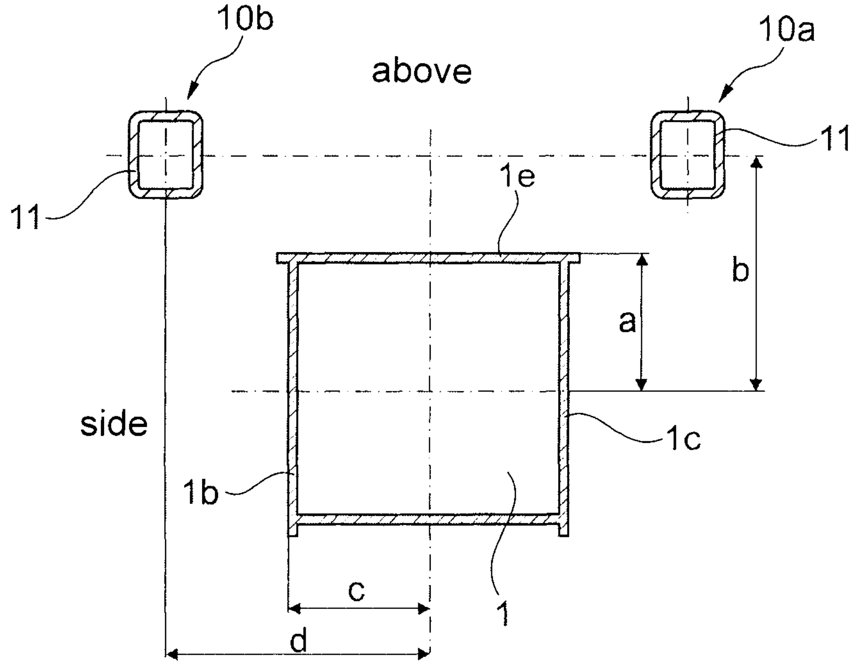

FIG. 12 shows an improved design of the working machine, which now does not include a single bracing, but instead two parallel bracings 10*a*, 10*b* identical in design. Each of these bracings is designed according to an embodiment of FIGS. 1 to 11 and 13, respectively. What is, however, essential for the bracings 10*a*, 10*b* extending in parallel is the fact that the distance b of the tension element centroid to the boom body centroid is greater than the distance a of the boom body upper chord 1*e* to the boom body centroid. The same applies for the lateral distance d of the tension element centroid to the boom body centroid, which is greater than the distance c of the side walls 1*b*, 1*c* of the boom 1 to the boom body centroid. By means of the spatial bracing it is possible to compensate not only bending moments, but also side moments.

Reference numerals 20-23 denote axes on connecting levers 15, 16 in FIG. 4 where the tension elements 11*a*, 11*b*, 11*c* are pivotally mounted.

The invention claimed is:

1. A working machine, comprising a boom (1), a multipart boom bracing (10), at least one actuator (14) arranged to actuate the boom bracing (10), a turntable (2), an actuator lever (13) rotatably articulated to the turntable (2) and operatively connected to the boom bracing (10), to introduce tensile force into the bracing (10), two connecting levers (15, 16) rotatably articulated to the boom (1), with the multipart boom bracing (10) having three tension elements (11*a*, 11*b*, 11*c*) interconnected to each other and to the boom (1) through a respective one of the two connecting levers (15, 16), and with said three tension elements (11*a*, 11*b*) pivotally mounted at different axes (20-23) located on the respective connecting levers (15, 16).

2. The working machine according to claim 1, wherein the boom (1') is a bent or angled or kinked boom (1') and the multipart boom bracing (10) includes corresponding angular offsets between the tension elements (11*a*, 11*b*) to follow the bent or angled course of the boom (1').

3. The working machine according to claim 1, wherein at least one additional lifting actuator (5) is provided, which is articulated to the turntable (2) and to the boom (1) and pushes the boom (1) upwards during lifting.

4. The working machine according to claim 3, wherein one of the connecting levers (15, 16) is articulated to the lifting actuator (5) or a dipper arm actuator (6) at the boom (1).

5. The working machine according to claim 1, additionally comprising a boom transverse tube (17) through which the one (15) of the connecting levers (15, 16) is articulated to the boom (1), and configured for introducing lifting actuator (5) forces or dipper arm actuator (6) forces into the boom (1).

6. The working machine according to claim 5, wherein connection between the respective connecting lever (15) and the boom transverse tube (17) is effected by at least one tab (18) integrally molded to an outer circumference of the boom transverse tube (17).

7. The working machine according to claim 1, wherein at least two boom bracings (10*a*, 10*b*) extend in parallel, and each of the bracings (10*a*, 10*b*) is actuatable by one or more actuator/actuator lever combinations.

8. The working machine according to claim 1, wherein an uppermost tension element (11*c*) of the boom bracing is articulated directly to a dipper arm (3).

9. The working machine according to claim 1, wherein the actuator (14) comprises an energy recovery cylinder (14) coupled to both the actuator lever (13) and the turntable (2), and a lowermost tension element (11*a*) is pivotally attached to a free end of the actuator lever (13).

10. The working machine according to claim 1, wherein one end of said actuator lever (13') is coupled to said actuator (14'), and an opposite end of said actuator lever (13') is coupled to a lowermost tension element (11*a*), and with said actuator lever (13') supported at an articulation point between said actuator (14') and said lowermost tension element (11*a*).

11. The working machine according to claim 1, wherein the actuator lever (13) is articulately mounted on the turntable (2) at an articulation point coinciding with a bearing point of the boom (1) on the turntable (2).

12. The working machine according to claim 1, additionally comprising a lifting cylinder (5) articulated to both the boom (1) and the turntable (2), wherein one of the connecting levers (15, 16) is articulated to the boom (1) at a bearing point of the lifting cylinder (5) on the boom (1).

13. The working machine according to claim 1, additionally comprising a dipper arm (3) pivotally articulated to an end of the boom (1) opposite the turntable (2), and a dipper arm cylinder (6) coupled to both said dipper arm (3) and said boom (1), wherein one of said connecting levers (15,16) is articulated to said boom (1) in a region of a bearing axle of the dipper arm cylinder (6).

14. The working machine according to claim 1, additionally comprising a dipper arm (3) pivotally articulated to an end of the boom (1) opposite the turntable (1), wherein an uppermost tension element (11, 11*b*, 11*c*) is directly connected to the dipper arm (3).

* * * * *